(12) United States Patent
Satou et al.

(10) Patent No.: US 6,179,309 B1
(45) Date of Patent: Jan. 30, 2001

(54) STRUCTURE FOR MOUNTING A COIL SPRING TO A VEHICLE BODY AND METHOD THEREFOR

(75) Inventors: Masaharu Satou; Yutaka Hozumi, both of Kanagawa-ken (JP)

(73) Assignee: Nissan Motor Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/009,185

(22) Filed: Jan. 20, 1998

(30) Foreign Application Priority Data

Jan. 20, 1997 (JP) .................................................... 9-007998

(51) Int. Cl.⁷ .................................................... B60G 15/00
(52) U.S. Cl. .......................... 280/124.155; 280/124.146; 280/124.147; 280/124.154; 280/124.162; 280/124.165; 280/124.179
(58) Field of Search ..................... 280/124.155, 124.154, 280/124.151, 124.147, 124.146, 124.145, 124.144, 124.162, 124.164, 124.165, 124.177, 124.179, FOR 154, FOR 158, FOR 173, FOR 181; 248/565

(56) References Cited

U.S. PATENT DOCUMENTS

| 4,087,117 | | 5/1978 | Brace et al. . |
| 4,400,008 | | 8/1983 | Rumpel . |
| 4,480,852 | | 11/1984 | Rumpel . |
| 4,981,287 | * | 1/1991 | Cothenet ........................ 280/124.155 |
| 4,989,894 | | 2/1991 | Winsor et al. . |
| 5,275,389 | * | 1/1994 | Pinch et al. . |
| 5,658,006 | * | 8/1997 | Freeman et al. ............... 280/124.179 |

FOREIGN PATENT DOCUMENTS

1044393 * 11/1953 (FR) ..................................... 280/154

* cited by examiner

Primary Examiner—Eric Culbreth
(74) Attorney, Agent, or Firm—McDermott, Will & Emery

(57) ABSTRACT

In order to reduce a partially concentrated load affecting a spring seat by repulsion of the coil spring, an edge of the upper end of the coil spring is disposed against a portion of the spring seat having a relatively low solidity. Therefore, it is possible to eliminate the problem that the coils of the coil spring interfere with each other if a mid-portion of the coil spring in vertical direction is offset to the side to provide a partially concentrated load.

14 Claims, 6 Drawing Sheets front of the vehicle

STRUCTURE FOR MOUNTING A COIL SPRING TO A VEHICLE BODY AND METHOD THEREFOR

BACKGROUND OF THE INVENTION

1. Field of the Invention

The present invention relates to a method of mounting a coil spring of a suspension system between a suspension component and a body component of a vehicle and structure for mounting the coil spring to the body component. More particularly, the present invention relates to such a method and the structure which are adapted to reduce a partially concentrated load which affects the spring seat by repulsion of a coil spring.

2. Description of the Related Art

Coil springs such as suspension springs, which have essentially vertically oriented axis, are known to be mounted between a suspension component and a body component in a manner wherein a lower end of the coil spring is supported on the suspension component such as a lower link, and wherein an upper end is attached to the body component via a spring seat.

SUMMARY OF THE INVENTION

It is an object of the present invention to provide a method of mounting a coil spring of a suspension system between a suspension component and a body component of a vehicle comprising a simple arrangement capable of reducing a partially concentrated load which affects a spring seat by repulsion of the coil spring.

It is another object of the present invention to provide a structure for mounting a coil spring which comprises a simple arrangement which will reduce a partially concentrated load and effect a spring seat by repulsion of a coil spring.

In brief, the above objects are achieved by an arrangement wherein, in order to reduce a partially concentrated load affecting a spring seat which is generated by repulsion of a coil spring, the arrangement comprises an edge of the upper end of the coil spring being disposed against a portion of a spring seat having a relatively lower rigidity or solidity as it will be referred to hereafter. Thus, the partially concentrated load is absorbed by the spring seat, and interference between turns of the coils is prevented.

More specifically, a first aspect of the invention resides in a method of mounting a coil spring of a suspension on a vehicle body comprising: disposing a lower end of the coil spring against a suspension component; disposing an upper end of the coil spring against a spring bracket via a spring seat; connecting the spring bracket to a vehicle body; and disposing an edge of the upper end of the coil spring against a portion of the spring seat having a relatively lower solidity.

A second aspect of the invention resides in a structure for mounting a coil spring of a suspension to a vehicle body comprising: a coil spring disposed against a suspension component at it s lower end and disposed against a spring bracket via a spring seat at its upper end; the spring bracket being connected to a vehicle body; the spring seat including a relatively lower solidity portion which accepts an edge of the upper end of the coil spring.

BRIEF DESCRIPTION OF THE DRAWINGS

The various other objects and features of this invention will become more clearly understood from the following description which is taken in conjunction with the appended drawings in which.

DETAILED DESCRIPTION OF THE INVENTION

Figure 1:
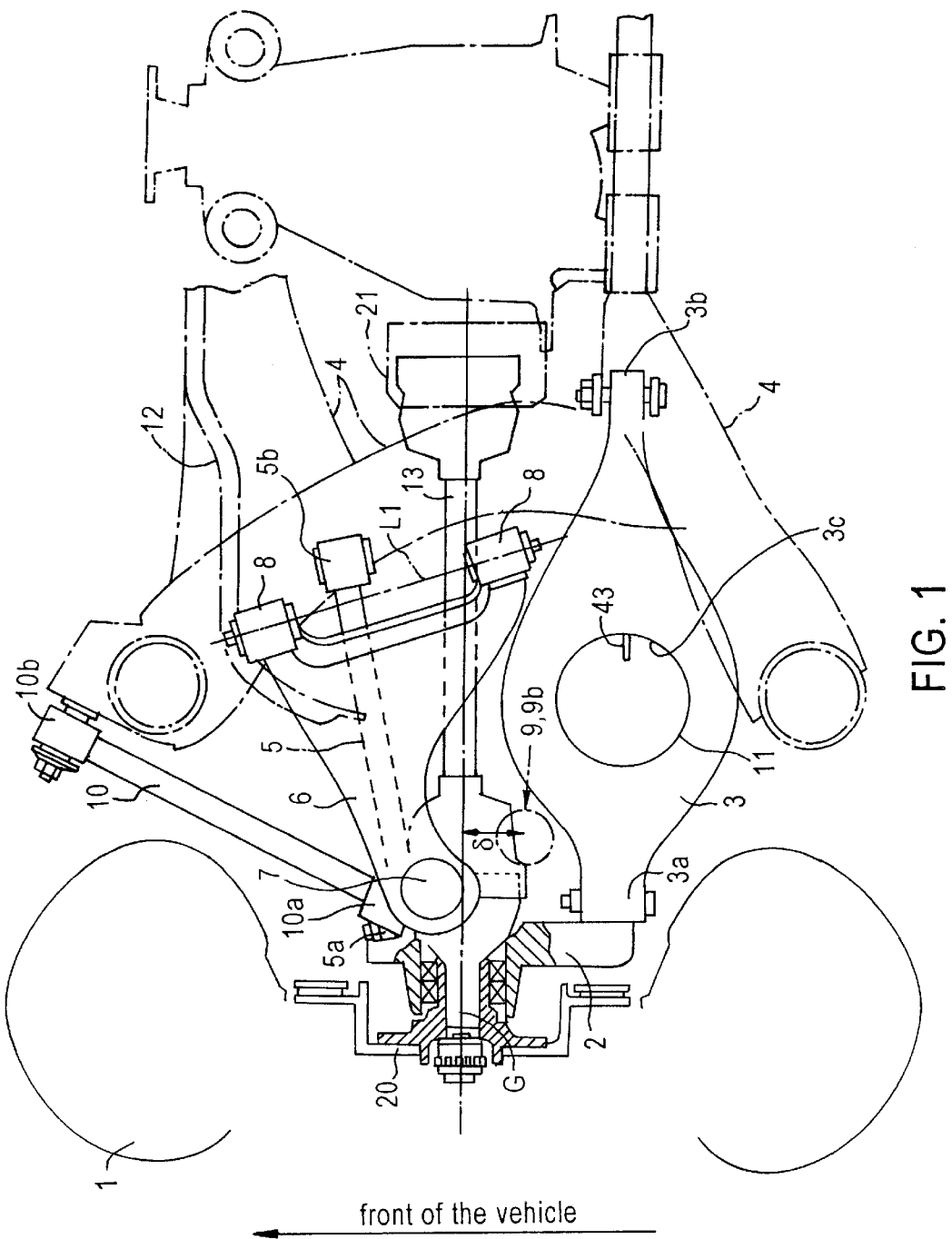
FIG. 1 is a plan view of a suspension of an embodiment of this invention.
Figure 2:
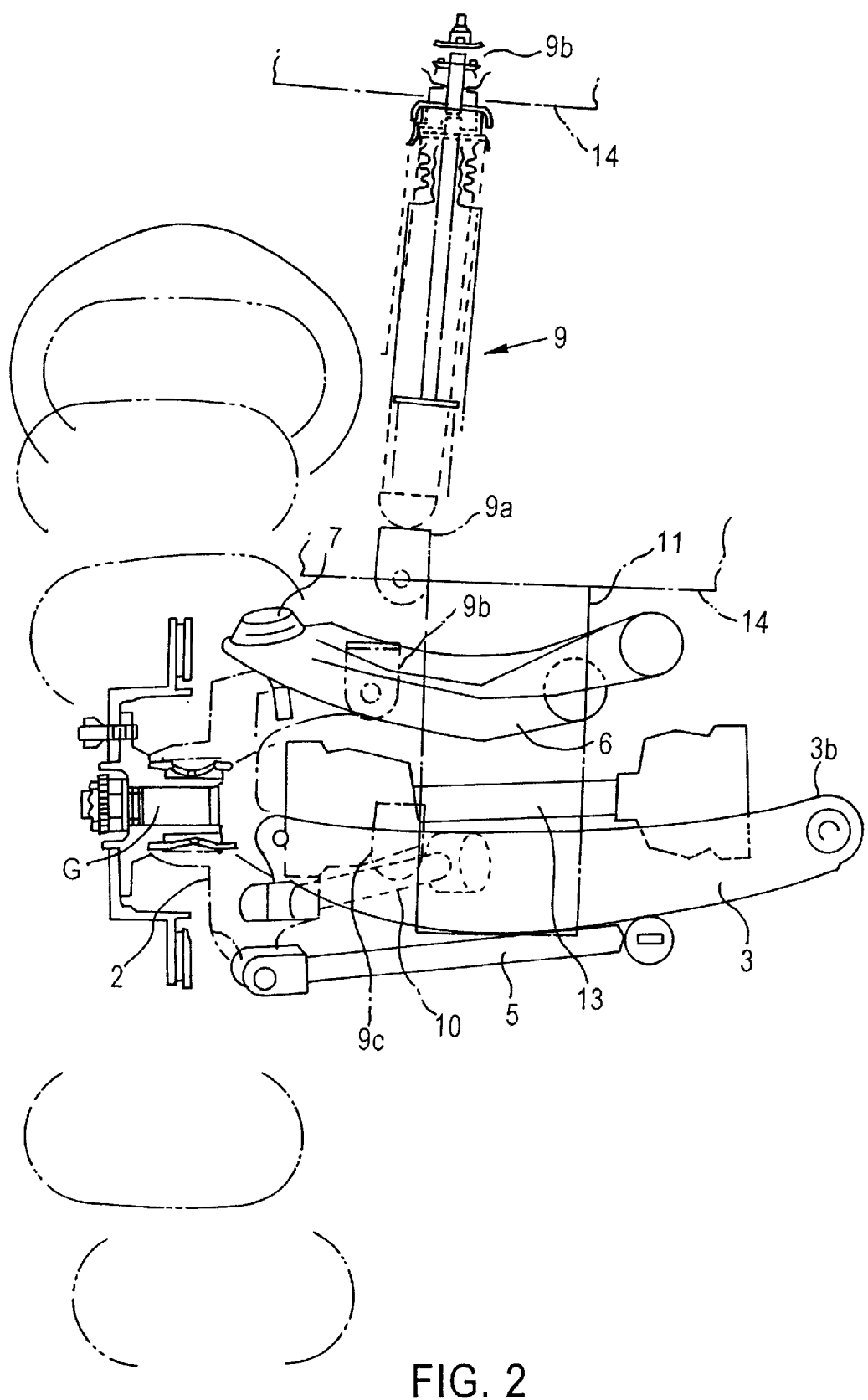
FIG. 2 is a rear view of the suspension of an embodiment of this invention.

Referring to the attached drawings, FIGS. 1 and 2 show a double wishbone type rear suspension system of a vehicle, which in this instance is, merely by way of example, provided on the left side of the vehicle.

An outboard end 3a of a side rod 3 is connected, so as to be pivotal in the vertical direction, to a lower and rear part of an axle 2 which rotatably supports a road wheel 1. The side rod 3 extends laterally with respect to the vehicle and is movably connected so as to be pivotal, in the vertical direction, with respect to a body member 4, such as a suspension member, at an its inboard end 3b. An outboard end 5a of a lower link 5 is pivotally connected to a lower and front part of the axle 2. An inboard end 5b of the lower link 5, which extends approximately laterally with respect to the vehicle, is pivotally connected the body member 4.

An outboard end of an upper link 6, which is formed by an A-shaped arm, is pivotally connected to an upper part of the axle 2 via a ball joint 7. Each of two connection points at the inboard ends of the upper link 6 is connected to the body component 4 via a bush 8. An axis L1 about which the inboard end of the upper link 6 is pivotal, has an inclination to a center axis of a vehicle body. The suspension is set up to provide an anti-lift geometry through the inclined axis L1 since the upper link 6 pulls an upper part of the axle 2 forward with respect to the longitudinal axis (the front and rear direction) of the vehicle when the wheel 1 bounds from a neutral position.

A first end 10a of a trailing arm 10 is movably connected in vertical direction to a lower and front part of the axle 2. The trailing arm 10 extends slantwise with respect to the vehicle, and a second end 10b of the trailing arm 10 is movably connected to the body member 4. The trailing arm 10 effects the axle 2 by pulling it forward when the wheel bounds and rebounds from the neutral position.

Therefore, the suspension link structure of this embodiment is arranged such that the axle 2, in other words the wheel 1, moves only in the fore-and-aft direction of the vehicle in the case when the wheel 1 bounds or rebounds from neutral position, and the upper part of the axle 2 moves as if it were pulled forward in fore-and aft direction of the vehicle at least when the wheel 1 bounds.

The letter "G" denotes a center of gravity of the axle, which in this embodiment, is almost coincident with the center of wheel 1. A lower end 9a of a shock absorber 9 is connected to the upper part of the axle 2. The shock absorber 9 is disposed in a manner wherein its axis is essentially vertical, and an upper part 9d thereof is connected to the body component 14 via a mount rubber. A reference character '9b' shows the position of a lower part of the shock absorber 9 which is connected to the axle 2 in normal position, '9a' shows the case of bound position, and '9c' shows the case of rebound position.

The reference numeral 12 denotes a stabilizer, which is connected to the upper link 6 via a connecting rod (not shown). The reference numeral 13 denotes a drive shaft, which has an outboard connecting part pivotally connected to a hub 20 of the wheel 1 via a first constant velocity joint, and an inboard connecting part which is pivotally connected to a differential device 21 via a second constant velocity joint.

A recess 3c for mounting a coil spring 11 is formed in a middle part of the side rod 3. A lower end of the coil spring 11, which is a suspension spring in this arrangement, is fixed to the side rod 3 as a suspension component, via disposition of its lower end into the recess 3c.

A projection 43 which acts as a stopper for the coil spring 11 and which provides a rotation preventing function, is formed in the recess 3c. This projection 43 locates an edge of a lower end of the coil spring 11 in a determined position so that an edge of an upper end of the coil spring 11 is disposed on the far side, in the fore-and-aft direction, at least, of the inclined surface. This projection also prevents rotation of the spring 11.

The rotation preventing effect is not limiting on the projection 43, and another structure, which can determine the position of the edge of the lower end of the coil spring 11, is suitable for use with this invention. For example, a spirally inclined surface conducting the edge of the lower end of the coil spring 11 and directing it to a circumference direction is formed in the recess 3c, the position of the edge of the lower end of the coil spring 11 is determined by attaching the edge to a gap provided an end of the spiral inclined surface.

The coil spring 11, whose axis extends vertically, is connected to the body component 14 at its upper end via a spring bracket 30. The spring bracket 30 in this embodiment has a structure shown in the plan view of FIG. 3, the cross-sectional rear view of FIG. 4, and the cross-sectional side view of FIG. 5.

The spring bracket 30 includes a spring guide 31 which is disposed at the center of the spring bracket 30, a spring receiving part 32 which is disposed at an outer circumference of the spring guide part 31, and a connecting part 33 which is disposed at an upper side of the spring guide 31.

The spring guide 31 comprises a conical shaped cylindrical member whose diameter reduces downwardly, and is almost coaxially insertable into the upper end 11a of the coil spring 11.

The spring receiving member 32, which is integrally connected to an upper part of the spring guide 31, comprises a plate which is disposed about an outer circumference of the spring guide 31. A seat rubber 34 is bonded to a lower surface of the spring receiving member 32, and a mount rubber 35 is bonded to the upper and outer surfaces thereof.

A slit 50 is provided between a spring fitting part 34a of the seat rubber 34, to which the coil spring is attached, and the spring receiving part 32 at an inner circumferential side of the seat rubber 34. Further, a slit 51 is provided between the spring fitting part 34a and the spring receiving part 32 at an outer circumferential side of the seat rubber 34. These slits 50, 51, make it possible to improve the durability of the seat rubber 34 by relieving a load which may be applied by the coil spring 11. It is, however, not necessary to form a slit in an outer circumference of left side of the seat rubber 34 shown in FIG. 4 when there is sufficient distance between the spring fitting part 34a and an end of the seat rubber 34 in radial direction.

Figure 5:
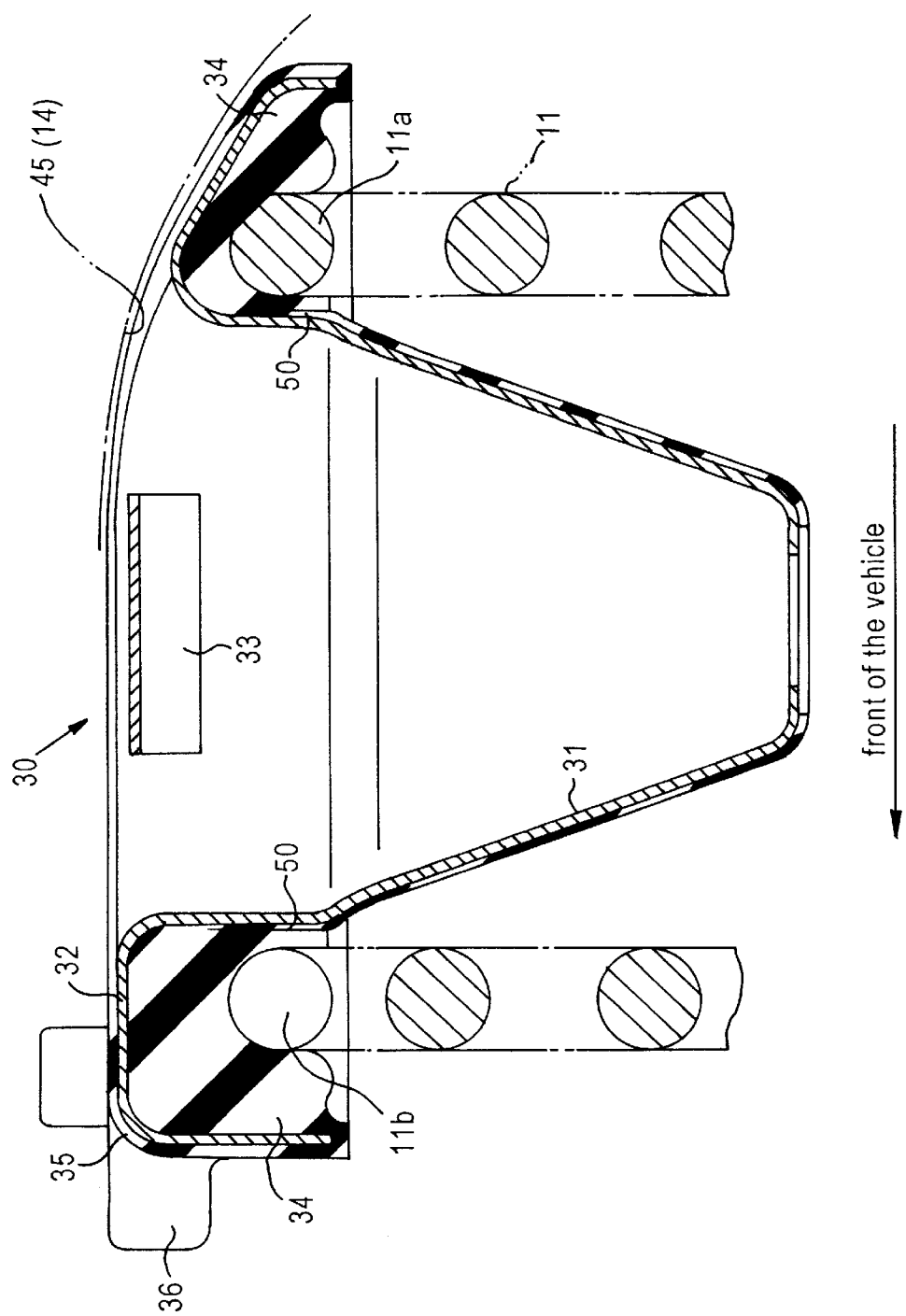
FIG. 5 is a side sectional view of a spring bracket of an embodiment of this invention.

In this embodiment, a rear part of an upper surface of the spring receiving part 32 is formed as an inclined surface which is inclined toward the rear of the vehicle body as shown in FIG. 5. This coincides with an inclination of a bracket fitting surface 45 of the body component 14 which is provided to improve the trunk room space at a rear side of the vehicle. As a result, a thickness of the seat rubber 34, which is attached to a lower surface of the spring bracket 30, is relatively thin at a portion which is opposed to the bracket fitting surface 45.

Figure 3:
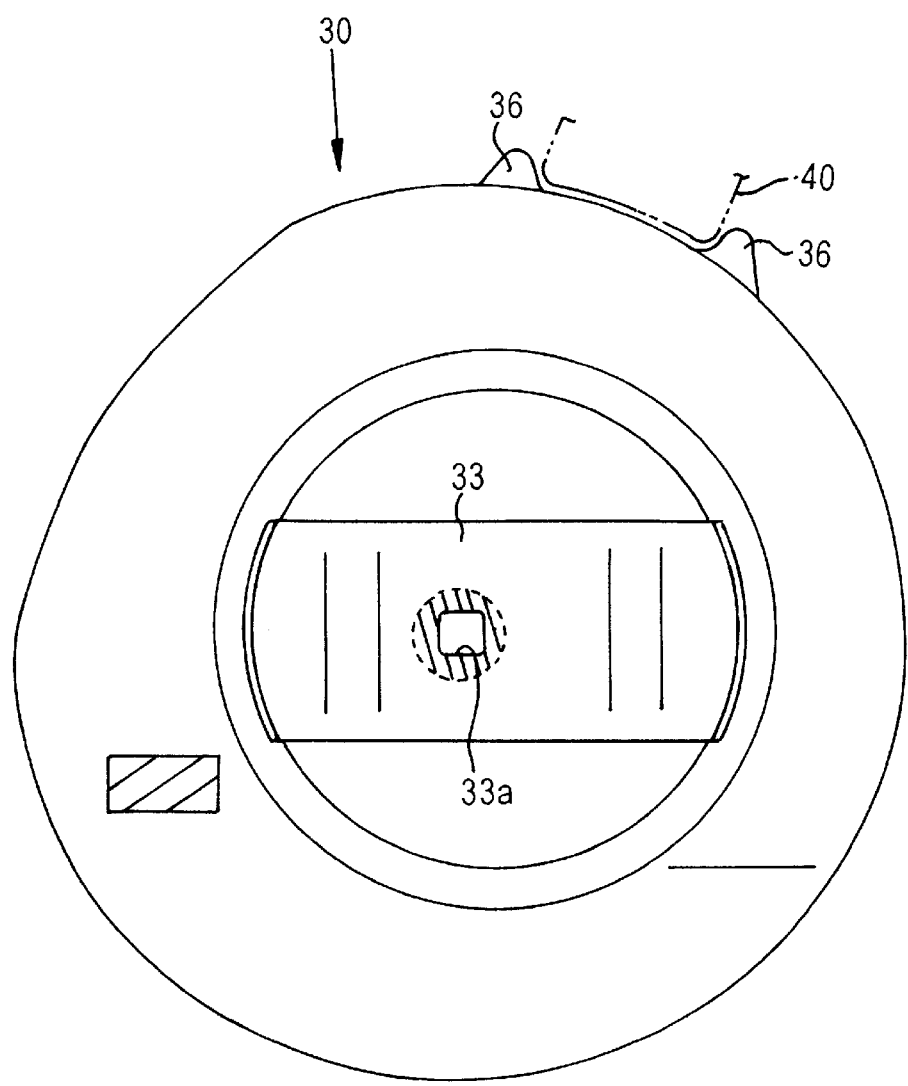
FIG. 3 is a plan view of a spring bracket of an embodiment of this invention.
Figure 4:
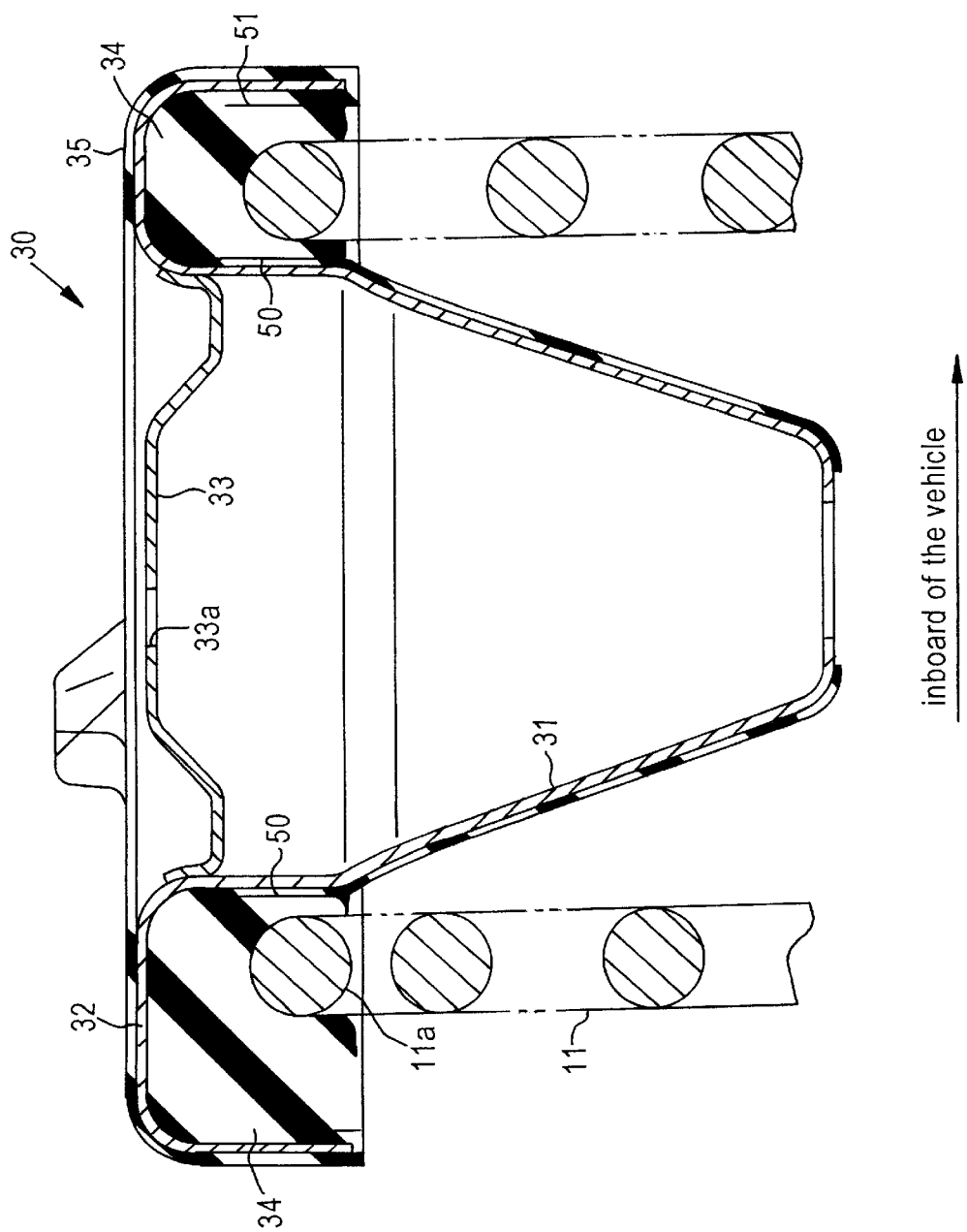
FIG. 4 is a rear sectional view of a spring bracket of an embodiment of this invention.

Two projections 36, which form the rotation preventing device, project outwardly from the spring receiving part 32 at its outer circumference, as shown in FIGS. 3 and 5. These projections 36 are made of rubber and it is accordingly possible to prevent noise when the projections 36 contact other parts of the vehicle.

As described above, the spring bracket 30 includes the connecting part 33. In this arrangement the connecting part is made of a plate which bridges across an inner circumference of an upper end of the spring guide part 31, and is provided with a securing hole 33a at a center portion of the spring bracket 30 as seen in plan view.

Figure 6:
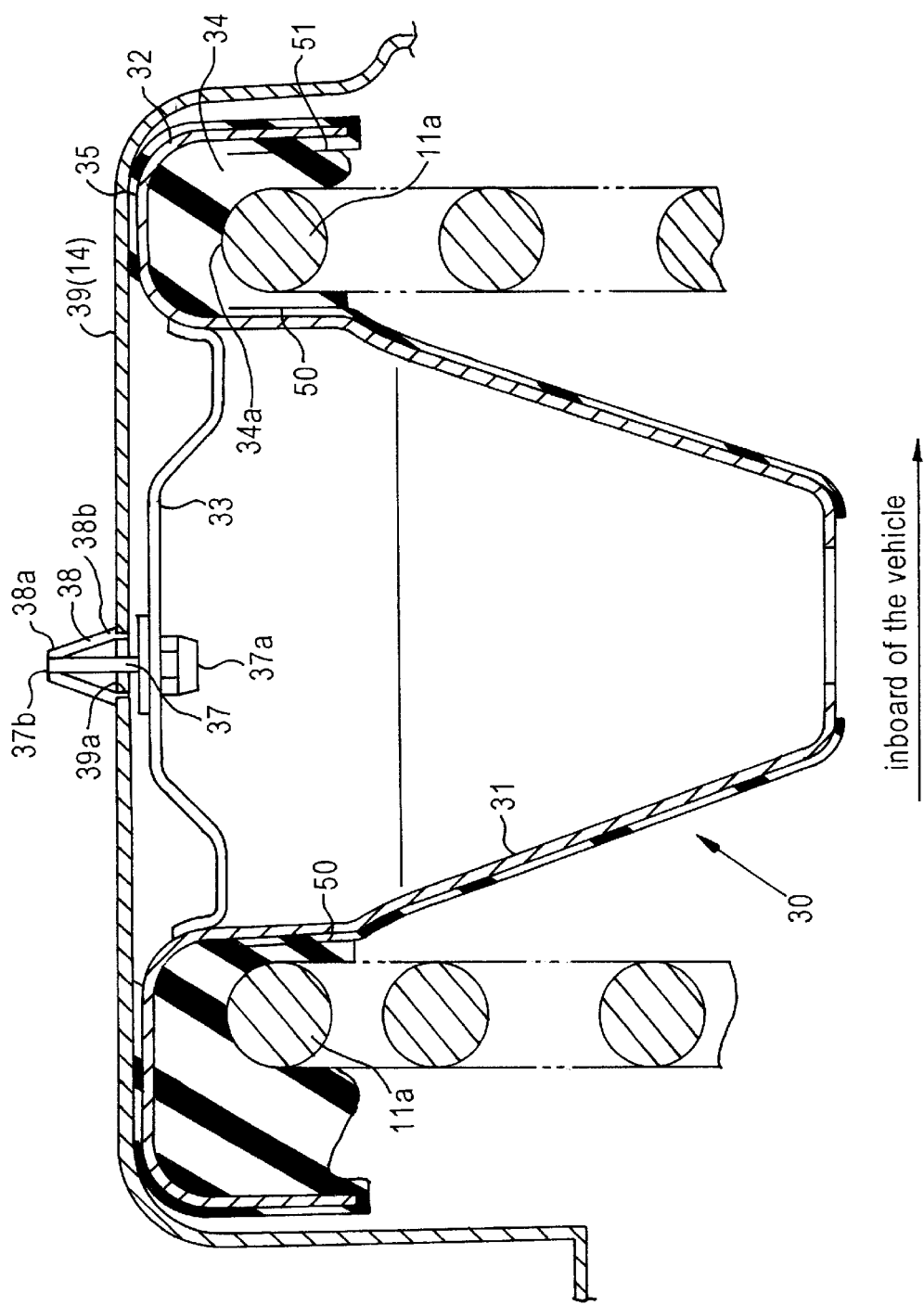
FIG. 6 is a rear sectional view of a connection of the spring bracket and a body bracket.

A pin 37 is attached to the securing hole 33a shown in FIG. 6. The pin 37 projects in an upper direction, namely toward the body component 14, in a manner which fixes a base part 37a of the pin 37 to the securing hole 33a, and is provided with a hook-shaped part 38.

A first end 38a of the hook-shaped part 38 is axially supported to a top part 37b of the pin 37, and a second end 38b of the hook-shaped part 38 is pre-loaded extending to circumferential direction.

Reference numeral 39, shown in FIG. 6, denotes a body bracket which comprises a part of the body component 4. The body bracket 39 is a plate structure which is formed in a shape so that an inner surface of the bracket 39 is able to match an outer surface of the spring bracket 30. The spring bracket 30 is attached to the body bracket 39 as the body component 14 via the rubber mount 35 by fitting the spring bracket 30 into the body bracket 39 from lower side.

An end 11b of the upper part of the coil spring 11 is attached to a relatively thick portion of the seat rubber 34 by fitting the upper terminal end 11b to the spring bracket 30 in a condition that the end 11b is disposed to a forward side in the fore-and-aft direction of the vehicle body.

A fitting hole 39a is provided at a center portion of the body bracket 39 as seen in plan view. The pin 37 goes through the fitting hole 39a and is secured to the fitting hole 39a by engagement with the second end 38b of the hook-shaped part 38 to the upper end of the body bracket 39.

Thus, the spring bracket 30 is attached to the body component 14 by the pin 37. The body bracket 39 includes a second projection 40, which is projected inwardly at an inner circumference of the body bracket 39 and is engaged between two of first projections 36 (shown in FIG. 3). A rotational movement of the spring bracket 30 surrounding the pin 37 to the body component 14, in other words, a displacement in circumferential direction, is prevented by the disposition of the second projection 40 between two of first projections 36.

In this embodiment, the spring bracket 30 is connected to the body bracket 39, as a part of the body component 14, at an inner circumferential position from the spring receiving part 32. Therefore, it is not necessary to provide a flange at the outer circumference of the spring receiving part 32 for attaching the spring bracket 30 to the body bracket 39. As a result, the space required for upper mount structure is reduced.

Additionally, it is only necessary to provide the one body bracket 39 for fitting the spring bracket 30 and to perforate one securing hole 33a in the body component 14 for mounting the coil spring 11 to the body component. Accordingly, it is possible to use a simply a mounting structure which is easy to work with, even though a part of the body component 14 which is opposed to the spring bracket 30 has an inclined surface, and to reduce the space occupied by mounting the upper end of 11a of the coil spring 11.

In the above described embodiment for mounting a coil spring, it is easy to avoid the problem wherein the edge 11b, where the density of spirals of the coil spring 11 is highest, is attached to a portion of the seat rubber 34, which is relatively thin, and thus has a relatively high solidity. Therefore, a partially concentrated load, which is transmitted from the coil spring 11 to the seat rubber 34, is reduced.

Consequently, it is possible to eliminate the possibility the turns of the coil spring 11 interfere with each other in the event that a mid-portion of the coil spring 11, in the vertical direction, is offset to the side in a manner which causes a partially concentrated load.

Additionally, this embodiment can be implemented by a simple method of setting the edge 11b of the coil spring 11 to seat against a predetermined portion of the seat rubber 34, and thus obviate the need for a change in the structure of the spring bracket. Therefore, it is possible to eliminate shortening the length of the coil spring 11 mounted to the spring bracket 30.

Since the position of the edge of the lower end of the coil spring 11 is determined by the projection 43 of the side rod 3, it is possible to prevent sliding of the upper terminal end or edge 11b of the coil spring 11 which is located at the other end thereof in a circular direction relative to the seat rubber 34 after mounting and during use of the suspension.

Although the invention has been described with respect to mounting the coil spring of a rear suspension of a vehicle which has the trunk room, this invention can be applied to a front suspension or to any other type of the vehicle. In such a case, it is possible to implement the invention by disposing the upper end of the coil spring against a surface of the body component which is opposed to the spring bracket thus avoiding a relative lowering in vertical direction.

Although the invention has been described with respect to the case that there is an inclined portion at the attaching surface of the body component opposed to the spring bracket, if the attaching surface is plane surface, the invention according to the appended claims, should be designed so that the upper edge of the coil spring is attached to a relatively lower solid portion of the seat rubber by changing the height and solidity of the seat rubber in a circular direction by way of, for example, inserting a similar member between the attaching portion and an upper surface of the spring bracket. Or, the solidity of the seat rubber in a circular direction may be designed by way of changing the material thereof In a circular direction.

Although the invention has been described with respect to securing the edge of the lower end of the coil spring to the suspension component through the rotation preventing device, the appended claims are not limited thereto. However, there is a possibility that the position of the upper edge of the coil spring may move in a circular direction in use of the suspension if the lower edge of the coil spring is not secured to the suspension component.

What is claimed is:

1. A method of mounting a coil spring of a suspension system to a vehicle body comprising:

disposing a lower part of said coil spring on a suspension component;

disposing an upper part of said coil spring on a spring bracket via a resilient elastomeric spring seat member, the spring seat member having a first portion and a second portion, the second portion having less resilience than the first portion;

positioning an end of said upper part of said coil spring on the first portion of said spring seat; and engaging a portion of the lower end of the spring with a projection which is provided on the suspension component to prevent the rotation of the spring with respect to the suspension component and the first and second portions of the spring seat.

2. A spring mounting arrangement for mounting a coil spring of a suspension system to a vehicle body comprising:

said coil spring, a lower part of said coil spring being disposed against a suspension component, an upper part of the coil spring being disposed against a spring bracket;

said spring bracket being disposed between said vehicle body and said coil spring; and an elastomeric resilient spring seat disposed between said spring bracket and said coil spring, said elastomeric resilient spring seat including a first portion and a second portion, the first portion having a resilience which is higher than the second portion;

wherein said first portion supports a terminal end of said upper part of said coil spring.

3. A spring mounting arrangement for mounting a coil spring of a suspension system to a vehicle body as claimed in claim 2, wherein said spring bracket is disposed against a body component of said vehicle body which has a first panel portion and a second inclined panel portion, in a manner wherein the second portion of the spring seat is located below the second inclined panel portion.

4. A spring mounting arrangement for mounting a coil spring of a suspension system to a vehicle body as claimed in claim 3, wherein said structure is applied to a rear suspension of a vehicle which has a trunk.

5. A spring mounting arrangement for mounting a coil spring of a suspension system to a vehicle body as claimed in claim 2, further comprising a rotation preventing device which prevents the coil spring from rotating.

6. A spring mounting arrangement for mounting a coil spring of a suspension system to a vehicle body as claimed in claim 5, wherein said rotation preventing device restricts rotational movement of a lower part of said coil spring.

7. A spring mounting arrangement for mounting a coil spring of a suspension system to a vehicle body as claimed in claim 5, wherein said rotation preventing device engages a lower portion of the spring and inhibits rotation of the spring and movement of an upper terminal end of the upper part of said coil spring over the first portion of the spring seat.

8. A spring mounting arrangement for mounting a coil spring of a suspension system to a vehicle body as claimed in claim 5, further comprising a rotation preventing arrangement which prevents rotation of the spring bracket with respect to the vehicle body and which locates the spring bracket in a single predetermined orientation with respect to the vehicle body, when the spring bracket is fastened to the vehicle body.

9. A spring mounting arrangement for mounting a coil spring which coil spring has a plurality of helical coils including an upper coil having a first terminal end portion and a lower end having a second terminal end portion and which coil spring is disposed between a) a body panel of a vehicle chassis and b) a suspension member pivotally mounted on the chassis, the mounting structure comprising:

an upper spring seat having an asymmetrically-configured annular spring receiving portion which extends about the periphery of the spring seat, said spring seat being disposed on the vehicle chassis so that it has a predetermined orientation with respect to forward/aft and lateral directions of the chassis;

an asymmetrically-shaped resilient member which is disposed in the annular spring receiving portion, the resilient member having a first resilient portion and a second less resilient portion which is contiguous with the first resilient portion, the first resilient portion being located in forward and outboard side portions of the spring receiving portion while the second less resilient portion is located in inboard and aft sides of the spring receiving portion, said resilient member being arranged with respect to the coil spring so that the first terminal end portion of the spring is located at a forward portion of the spring seat and such as to rest against the first resilient portion of the resilient member; and a projection provided on the suspension member which engages the second terminal end of the lower end of the spring and prevents the coil spring from rotating in a manner wherein the first terminal end portion moves away from its location at the forward portion of the spring seat.

10. A spring mounting arrangement as claimed in claim 9, wherein the resilient member comprises an elastomeric member, and wherein the first resilient portion has a larger cross-sectional area than the second less resilient portion.

11. A spring mounting arrangement as claimed in claim 9, wherein the body panel has a first panel portion and a second inclined body portion and wherein the upper spring seat is connected to the body panel so that a first part is located against the first panel portion and a second part including the aft side of the spring retaining portion is located against the inclined panel portion.

12. A spring mounting arrangement for mounting a suspension system to a vehicle, comprising:

a body component comprising a first panel portion and a second inclined panel portion which is located aft of the first panel portion, contiguous with the first panel portion, and inclined with respect thereto;

a spring bracket which is connected to the body component so that a first forward portion seats against the first panel portion and a second portion seats against the second inclined panel portion; and a seat rubber disposed on an underside of the spring bracket, said seat rubber having a first resilient portion which is located in the first forward portion of the spring bracket and a second less resilient portion which is located in the second portion of the spring bracket which seats against the second inclined panel portion, the first resilient portion being adapted to receive an upper terminal end of a coil spring which is disposed between the spring bracket and a pivotal suspension member in a manner wherein rotation of the spring is prevented.

13. A spring mounting arrangement for mounting a coil spring of a suspension system between a vehicle body and a suspension arm pivotally connected to the vehicle body, the spring having upper and lower ends which have upper and lower terminal end portions respectively, comprising:

a spring bracket which is so shaped and dimensioned as to be connectable to the vehicle body so that it has only one orientation with respect to the vehicle body and so that it has a first forward is oriented toward a front of the vehicle, said spring bracket having an asymmetrically-shaped seat rubber receiving portion;

an asymmetrically-shaped seat rubber disposed in the asymmetrically-shaped seat rubber receiving portion of the spring bracket, said seat rubber having a first resilient portion which is located in the first forward portion of the spring bracket and a second less resilient portion which is located in a second portion of the spring bracket which is located essentially diametrically opposite the first forward portion, the first resilient portion receiving thereagainst the upper terminal end of the spring; and a stopper projection which is disposed on the pivotal suspension arm and which engages the lower terminal end portion of the spring to prevent rotation of the spring with respect to the pivotal suspension arm.

14. A spring mounting arrangement as set forth in claim 13, wherein the spring bracket of the spring mounting arrangement is located proximate to and separate from a shock absorber mounting structure via which a shock absorber is connected to vehicle body.

* * * * *